United States Patent

[11] 3,589,457

| [72] | Inventor | Dan S. Joos<br>Murray, Utah |
|---|---|---|
| [21] | Appl. No. | 842,491 |
| [22] | Filed | July 17, 1969 |
| [45] | Patented | June 29, 1971 |
| [73] | Assignee | Intertek Controls, Inc.<br>San Diego, Calif. |

[54] WEIGHT MEASUREMENT
17 Claims, 4 Drawing Figs.

[52] U.S. Cl. ............................................ 177/1,
177/211, 235/92 WT, 340/347 AD, 324/99
[51] Int. Cl. ............................................ G01g 3/14
[50] Field of Search ............................................ 177/1, 70,
210, 211; 235/92 WT; 340/347 AD, 230; 324/99,
120, 250

[56] References Cited
UNITED STATES PATENTS

| 3,525,991 | 8/1970 | Kohler | 177/211 X |
| 2,936,165 | 5/1960 | Thorsson | 177/211 |
| 3,106,979 | 10/1963 | Chilton | 177/210 |
| 3,125,176 | 3/1964 | Bale, Jr., et al. | 177/211 X |
| 3,173,505 | 3/1965 | Thorsson et al. | 177/70 |
| 3,221,828 | 12/1965 | Kohler | 177/210 |
| 3,263,761 | 8/1966 | Boadle et al. | 177/211 X |
| 3,368,637 | 2/1968 | Green et al. | 177/210 UX |
| 3,446,299 | 5/1969 | Leonowicz | 177/211 X |

FOREIGN PATENTS

| 859,432 | 1/1961 | Great Britain | 177/210 |

*Primary Examiner*—Richard B. Wilkinson
*Assistant Examiner*—George H. Miller, Jr.
*Attorney*—Lynn G. Foster

ABSTRACT: Weight measurement apparatus and method, the apparatus having normally balanced resistance bridge which becomes unbalanced in an amount which is a function of the weight being measured. A voltage-to-frequency converter senses the imbalance in the bridge and generates a pulse. A digital-to-analog converter is activated by the pulse to cause an increment of resistance to be added or subtracted into the bridge, each resistance increment being proportional to one unit of weight. If the bridge is not balanced by the addition of the resistance increment, the voltage-to-frequency converter will sense the imbalance and serially cause other resistance increments to be added or subtracted until no imbalance in the bridge is sensed. A pulse counter counts each of the pulses which activates the digital-to-analog converter so that the accumulated counts of the counter represent the weight.

PATENTED JUN29 1971 3,589,457

INVENTOR.
DAN S. JOOS
BY
Lynn L. Foster
ATTORNEY

WEIGHT MEASUREMENT

BACKGROUND

1. Field of the Invention

The present invention relates to force measurement and more particularly to novel electronic apparatus and method for electronically measuring weight.

2. The Prior Art

Prior art electronic weight measuring devices known to me principally include analog-to-digital converters (AD) which convert a voltage change in a load cell directly to a digital readout. It is well known that devices of this type are partially disadvantageous where the load cell is subjected to vibration and instability.

Vibrations cause such a rapid voltage change over a wide range that a meaningful readout is impossible. Efforts to make the AD devices effective in accurately displaying weight when the load cell is subject to vibration have been very expensive in terms of cost.

Also, resulting devices are generally unstable and read out weight measurement very slowly.

BRIEF DESCRIPTION AND OBJECTS OF THE INVENTION

The present invention, including apparatus and method, provides a novel system for measuring the weight of an object and includes structure for causing imbalance in a resistance bridge by an amount which is a function of the weight of an object. The imbalance in the bridge is incrementally offset until the bridge is balanced, the amount of offset required to balance the bridge being a measure of the weight of the object. The sensitivity of the apparatus is adjustable to allow for stable readings with surprising speed and accuracy even when the object and/or apparatus are subjected to vibration.

It is a primary object of the present invention to provide novel electronic measuring apparatus and method.

Another important object of the invention is to provide apparatus and method for electronically converting a mechanical force to a visual readout.

These and other objects and features of the present invention will become more fully apparent from the following description and appended claims taken in conjunction with the accompanying drawings wherein:

DETAILED DESCRIPTION OF THE PREFERRED EMBODIMENT

FIG. 1

Figure 1:
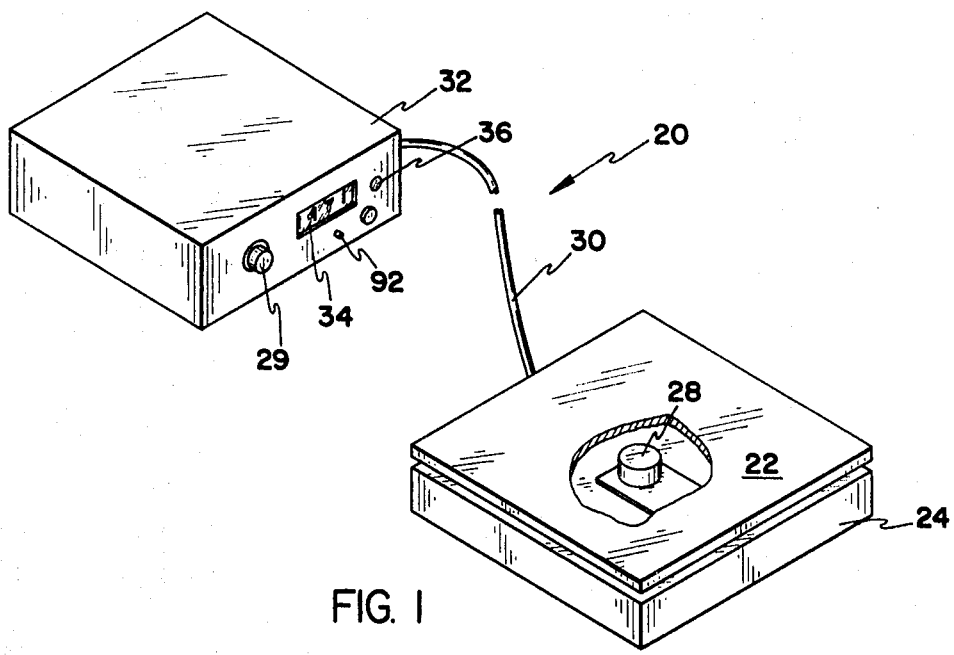
FIG. 1 is a schematic perspective view of one presently preferred weighing apparatus with parts broken away to reveal the interior thereof.

One presently preferred embodiment of the weighing apparatus, best illustrated in FIG. 1, and generally designated 20 comprises a weighing platform 22 which is preferably carried upon a rigid base 24. The base 24 is preferably rectangular in configuration and has, interior thereof, a load cell 28. The load cell 28 may be any suitable load cell commonly available. The load cell is mounted in conjunction with the platform 22 so that a force is exerted upon the load cell proportional to the weight of an object or substance upon weighing platform 22. Weighing platform 22 is preferably rectangular in configuration and is superimposed over the base 24 in contact with the load cell 28. When an object is placed upon the platform 22 a downward force is exerted upon the load cell 28 such that an electrical resistance proportional to the weight of the object is developed as will be hereinafter more fully described. A potentiometer 29 (FIG. 2) is provided at the input of the load cell to reference the load cell 28 to zero and accordingly compensate for the uncalibrated tare weight of the platform.

The load cell 28 is connected by a shielded cable 30 to a display console 32. Console 32 has a visual display readout 34 which is, in one preferred embodiment, a four-digit readout. If desired, a second display 36, such as a lamp, may be provided on the face of the console to serve a function hereinafter more fully described.

THE EMBODIMENTS OF FIGS. 2—4

Figure 2:
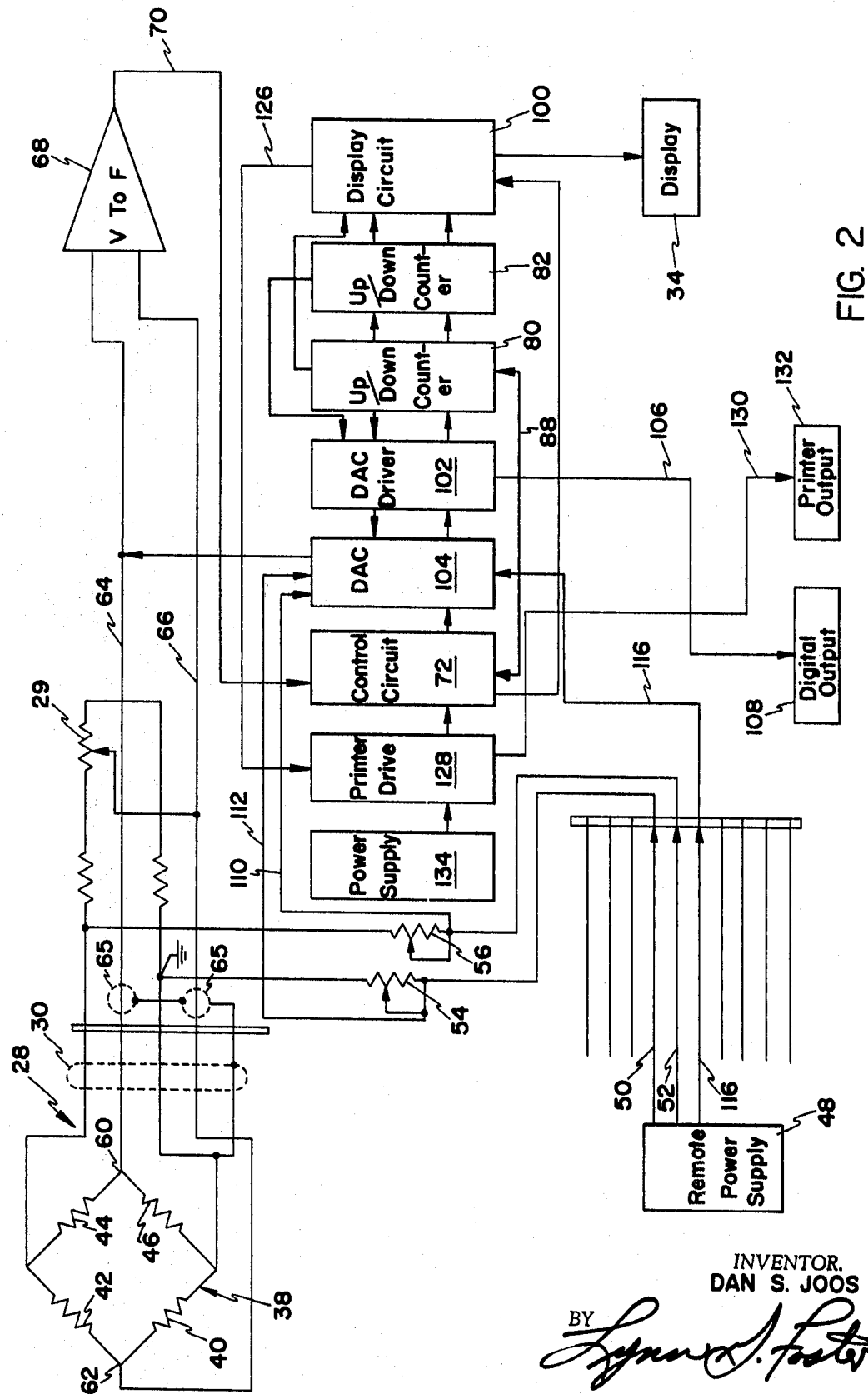
FIG. 2 is a schematic circuit diagram illustrating portions of the circuit in block diagram form.

Referring now to FIG. 2, the load cell generally designated 28 comprises a bridge 38 having variable resistors 40, 42, 44 and 46. The bridge 38 is energized by power from a remote source 48 through lines 50 and 52.

The power lines 50 and 52 from the remote power supply 48 to the bridge 38 are provided with span potentiometers 54 and 56. The span potentiometers can be adjusted by a remote knob (not shown) to vary the resistance range in the bridge 38. Thus, the apparatus 20 has the capability of measuring any weight within a plurality of ranges accommodated by the span potentiometers 54 and 56.

The magnitude of resistance generated by each resistor 40, 42, 44 and 46 varies in proportion to the amount of weight exerted upon load cell 28. When no weight is being exerted upon the load cell 28, the resistors 40, 42, 44 and 46 are balanced one with respect to the other. However, when a force is exerted upon the platform 22 (FIG. 1) the bridge 38 becomes imbalanced so that each of the resistances in the bridge varies in a direction opposite the adjacent two resistances. The resistive imbalance causes a voltage change in the outputs 60 and 62 and the voltage change is conducted by lines 64 and 66 to a Voltage-to-Frequency (VF) converter. Lines 64 and 66 are shielded as at 65 to minimize interference. Although any suitable VF converter could be used, a Hewlett Packard Model 2212 has been found to be adequate. Although the gain stability is of no significance in the VF converter, it is presently preferred that the VF converter have a minimum current drift at the input.

The voltage difference seen by the VF converter 68 in the lines 64 and 66 causes the VF converter to generate two signals, the one signal comprising pulses having a frequency proportional to the voltage difference and the other signal providing a polarity reference (i.e. indicating whether the signal is positive or negative). Both of the signals generated by the VF converter are communicated through line 70 to the control circuit 72.

Figure 3:
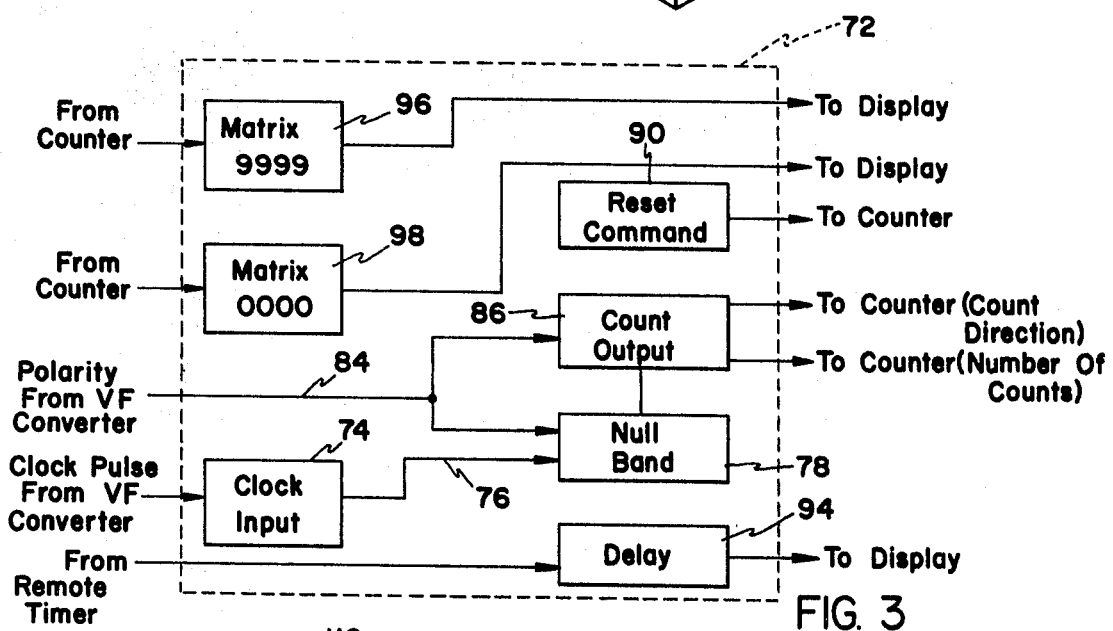
FIG. 3 is a schematic block diagram of the control circuitry of FIG. 2.

The control circuitry is best understood by reference to FIG. 3. The pulsed signal from the VF converter is communicated to a clock input 74 which shapes the pulses and thereafter communicates the pulses through line 76 to a null band 78.

The null band determines whether each pulse from the VF converter will activate counter 80 (FIG. 2) or whether a plurality of pulses sequentially accumulated in one direction are required. For example the null band 78 may be set so that 10 positive pulses or 10 negative pulses must be sequentially received before the counter 80 will be activated. The direction of the pulse count can be determined from the VF converter polarity signal which is simultaneously conducted to the null band through line 84.

One preferred embodiment of the null band comprises dividers which allow for three preferred functions. The first function is a bypass function wherein every pulse from the VF converter is communicated through the count output 86 to the counter 80. A second function is a divide-by-five function which requires five consecutive pulses in the positive direction or five consecutive pulses in the negative direction before a single pulse will be communicated to the count output 86.

Similarly, the third function is a divide-by-10 function which requires 10 consecutive pulses in the positive direction or 10 consecutive pulses in the negative direction before a single pulse is communicated to the count output 86. In any event, when the null band 78 communicates a pulse to the count output 86, both the number of counts, as reduced by the null band, and the count direction as determined by the polarity through line 84 will be communicated to the counter 80 through line 88 (FIG. 2).

Null band 78 has the distinct advantage of avoiding the common problem existing in prior art devices wherein vibrations existing in the load cell caused the readings on the visual display to change so fast that the actual reading could not be recognized by the human eye. The null band 78 comprising the presently preferred embodiment subtracts a predetermined number of pulses so that the count output 86 will conduct a reduced number of pulses to the counter 80. Thus, the count display is visually readable without adversely affecting the speed of the system 20.

The control circuitry 72 further comprises a reset command 90 connected to manual reset switch 92 (FIG. 1) on the console 32. The reset command serves as a manual quick check to indicate the operational state of the device. Also, a delay circuit 94 is provided which conducts signals from a remote timer (not shown) through a conventional time delay circuit arrangement which holds the signals from the counters 80 and 82 for a selected predetermined time increment so that when the weight on the platform rapidly fluctuates over a short range (e.g. as in monitoring the weight of a laden conveyor), the weight of the substance over selected intervals will be displayed long enough for an observer to see the digital readout value. In the aforementioned arrangement, a constantly monitored weight readout will be substituted for a readout of measurements taken at selected intervals as the weight on the conveyor fluctuates so that the average weight will be easily read.

The control circuitry 72 also comprises matrices 96 and 98. Matrix 96 combines the count direction and full scale nine output upon the display 34 (FIG. 1) so that if the force exerted upon the platform 22 is beyond the display range of the apparatus 20, the indicator 36 (FIG. 1) will be activated. Also, if the weight on the platform 22 is being gradually decreased (e.g. a differential weight is taken by removing some of a load of weight on the platform at spaced intervals) the indicator 36 will be actuated when the weight load gets below the full scale zero reading on the display 34. Thus, the indicator 36 serves to warn an operator when the substance being weighed is beyond the range of the apparatus 20.

If desired, a print command (not shown) may be included in the control circuitry 72 to cause the counter circuitry to hold a reading until a recording mechanism prints out the information relating to the count.

Referring again to FIG. 2, it can be appreciated that the output from the control circuitry 72 is communicated to the counter 80 and, thereafter, to the counter 82. Counters 80 and 82 are up/down counters which register and count pulses from the count output 86 after passing from the VF converter 68 through the null band 78. The counters register both the number and the direction of the count. It is presently preferred that biquinary counters be used. Each biquinary counter functions as a twin decade counter accommodating both up and/or count down and the two biquinary counters 80 and 82 allow for four-digit accuracy. The biquinary counters 80 and 82 are both connected to display circuitry 100 which, in turn, energizes digital display 34 for direct visual conversion to readout of the force exerted upon the platform 22.

Counters 80 and 82 also conduct a signal representative of the count to the Digital-to-Analog Converter (DAC) driver circuitry 102. The DAC driver then transfers the signal through line 106 to a conventional digital output 108 for remote display. The DAC driver also communicates the pulses to DAC circuitry 104, best illustrated in FIG. 4.

Figure 4:
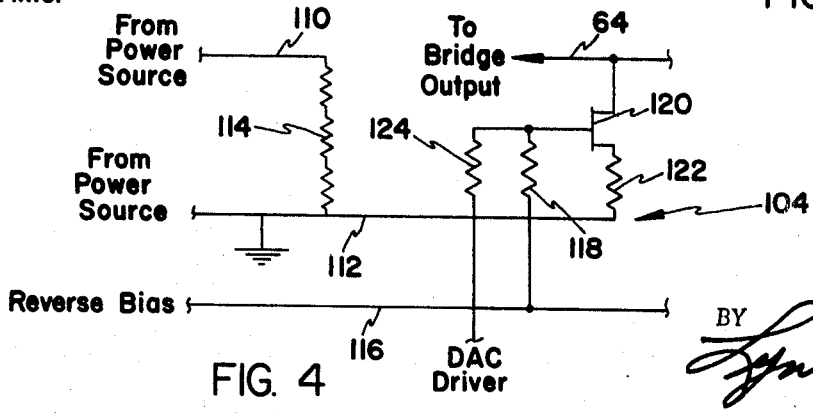
FIG. 4 is a schematic circuit diagram of a portion of the Digital-to-Analog converter (DAC) illustrated in FIG. 2.

With continued reference to FIG. 4, only one of a plurality of circuitry segments is shown in order to illustrate the structure and method of connecting additional parallel resistances into the bridge 38. Power from the remote power supply 48 to line 52 (FIG. 2) is communicated through line 110 to DAC circuitry 104. Power from the remote supply 48 is also communicated through line 50 and line 112 and, thereafter, to the DAC circuitry 104. Excitation voltage is communicated through the lines 110 and 112 and through a voltage divider 114, which separates line 110 from line 112.

A reverse bias is communicated from the remote power supply 48 (FIG. 2) through line 116 to a bias resistor 118 (FIG. 4). Bias resistor 228 places the reverse bias in the base of a Field-Effect Transistor (FET). A resistor 122 of selected value is connected in the line 112 in series with the FET 120. The value of the resistor 122 is preferably such that it is proportional to one unit of weight.

Normally, no current flows through the resistor 122 into the FET 120. However, when a signal is received from the DAC driver 102 through drive resistor 124, the FET is connected into line 64 to the bridge output 60. Thus, the resistor 122 shunts the resistor 46 (FIG. 2) out of the bridge to ground. Resistors 40, 42 and 44 respond by compensating for the resistance shunt across resistor 46, the amount of compensation being determined by the value of resistor 122. Thus, resistor 122 causes bridge 38 to be adjusted toward its normal balanced position.

Referring again to FIG. 2, if the resistance change in the bridge 38 is insufficient to completely balance the bridge, the VF converter will see the imbalance in terms of the voltage difference in lines 64 and 66 so that another pulse will appear in line 70 to activate the counters 80 and 82 and to cause the DAC driver 102 to connect another resistor (not shown), joined in parallel to resistor 122, through the DAC circuit to the output line 64 of the bridge 38. The process continues in seriatim until balance is achieved. Once balance is achieved, the display 34 will register the resistance needed to compensate the bridge 38 in terms of the weight of the substance upon platform 22.

The display circuitry 100 may, if desired, be connected by a line 126 to a printer drive circuit 128. The printer drive circuit 128 is connected by line 130 to a printer output 132 for driving a conventional printing mechanism (not shown). Internal power supply 134 is provided to power the components above described.

The circuit arrangement illustrated in FIG. 2 uniquely provides an electronic dampening action which provides the least dampening force when the bridge 38 is subjected to the greatest level of imbalance and progressively increased dampening forces as the bridge 38 moves closer to balance. Since the frequency from the VF converter is proportional to a function of the unbalance of the bridge 38, where the unbalance is amplified by a nonlinear amplifier, the signal from the VF converter will be much stronger when the bridge 38 is highly imbalanced and less strong when the bridge 38 is closer to balance. Thus, the counters 80 and 82 will be less sensitive to changes when the structure 20 is near the null point although the speed of the conversion from force upon the load cell 28 to visual readout at display 34 will be unaffected.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What I claim and desire to be secured by United States Letters Patent is:

1. A force measuring apparatus comprising:
   circuit means in an initial state of electrical balance and to which a force is thereafter applied creating an electrical imbalance;
   means including energy-to-pulse converting means to which the electrical state of the circuit means is conveyed and changing means which changes the force-induced electrical imbalance in successive increments to a plurality of substantially identical electrical resistances;

means interconnecting the changing means and the circuit means to progressively restore the electrical balance to the circuit means as the electrical resistances are successively incremented;

means in electrical communication with the changing means for sensing and displaying the number of resistances incremented to indicate an accurate measure of the force applied.

2. Apparatus for measuring weight comprising:

means for receiving a weight and unbalancing a resistance bridge, one side relative to the other, by an amount which is a function of the weight:

means including energy-to-pulse converting means to which the electrical state of the resistance bridge is conveyed and means changing resistance at the one side of the bridge only in uniform incremental steps until relative balance in the bridge results; and means for counting and indicating the number of uniform incremental steps made by the changing means as a function of the weight.

3. Weight conversion apparatus comprising:

a load cell comprising a balance bridge having at least four variable elements at least one of which is controlled by a force link, the resistance in the at least one element varying as a function of the force applied to the force link;

resistance control means for bringing the load cell to a zero reference state;

a voltage-to-frequency converter connected to the output of the load cell to sense resistance imbalance in the bridge due to the force on the force link and convert the imbalance to an electronic signal;

a pulse counter responsive to the signal of the voltage-to-frequency converter to count each pulse of the signal; and means having a plurality of resistance units each representative of the same amount of weight, which means successively connects one resistance unit to the bridge in response to each sequential count of the pulse counter until the bridge is balanced.

4. Apparatus for measuring the weight of an object comprising:

means for converting the weight of the object to an electrical resistance, said converting means comprising a balanced-resistance bridge which becomes imbalanced when subjected to the weight, the magnitude of the imbalance being a function of the weight of the object;

means activated by the electrical imbalance in the bridge for generating a plurality of output pulses at spaced intervals, the number of pulses being proportional to the magnitude of the imbalance;

means counting the output pulses from the generating means;

means for successively communicating increments of resistance into or out of the bridge commensurate with the pulse count of the counting means until the bridge becomes balanced; and means governed by the counting means for outputting the counts made which counts represent the increments of resistance required to balance the bridge as a function of the weight of the object.

5. Apparatus as defined in claim 4 wherein said converting means comprises potentiometer means for initially balancing the converting means to compensate for tare weight.

6. Apparatus as defined in claim 4 further comprising potentiometer means interposed between a source of electrical power and the converting means to select a conversion range of force-to-resistance so that the governed means will output directly in weight units.

7. Apparatus as defined in claim 4 further comprising control means comprising matrixing means for matrixing zeros or full scale nines and means associated with the matrixing means for remote display of the output when in excess of the maximum measuring level or below the minimum measuring level of the apparatus.

8. Apparatus as defined in claim 4 wherein said outputting means comprises biquinary count means comprising twin decade counters and means receiving output from the biquinary count means for visually displaying the output in weight units.

9. Apparatus as defined in claim 4 further comprising divider means into which the generating means output pulses comprising both count up and count down pulses are communicated for selectively adding the count up pulses and subtracting count down pulses and means for preventing activation of the communicating means until a predetermined number of consecutive pulses in the count up direction or until a predetermined number of consecutive pulses in the count down direction have been accumulated.

10. Apparatus as defined in claim 4 wherein said communicating means comprises a plurality of resistance means of substantially identical value and means responsive to the generating means for selectively joining resistance means in seriatim into the bridge and removing resistance means in seriatim from the bridge.

11. Apparatus as defined in claim 4 further comprising control means which separate pulses from the generating means into a plurality of diverse signals and means responsive to the diverse signals from the control means for communicating at least one increment of resistance out of the bridge to a balanced resistive state when the weight of the object is no longer imposed upon the converting means.

12. Apparatus as defined in claim 11 wherein said responsive means further comprises print command means for holding the indicated output for a preselected time and means for recording the output from the counting means prior to the expiration of the preselected time.

13. Apparatus as defined in claim 4 wherein said generating means comprises means for decreasing the strength of the output pulses of the generating means as the bridge approaches balance and for increasing the strength of the output pulses of the generating means as the bridge becomes more unbalanced so that the generating means is less sensitive when the apparatus is near the null point whereby count oscillation in the outputting means resulting from moving the object relative to the converting means is damped without adversely affecting the outputting means.

14. Apparatus as defined in claim 13 wherein the last said means comprises a digital-to-analog converter.

15. In a method of electronically converting a force to a detectable readout the steps of:

converting a force exerted upon force-receiving structure to an electrical resistance in one circuit;

determining the amount of force-induced electrical resistance and converting the energy thereof to a pulse;

developing a complementary resistive imbalance in another circuit in response to the resistance of the one circuit, the complementary resistive imbalance being achieved by connecting a plurality of parallel resistors of identical value one after another to the force receiving structure until the resistive imbalance is essentially proportional to the force converted into the electrical resistance;

combining the complementary resistive imbalance with the electrical resistance so as to effectively cancel the electrical resistance; and registering the amount of complementary resistive imbalance so developed.

16. In a method of registering the weight of an object comprising the steps of:

converting the weight of the object to an electrical resistance having a magnitude which is a function of the weight of the object;

unbalancing a normally balanced resistance bridge by an amount essentially proportional to the force converted into an electrical resistance;

generating pulses at spaced intervals, the pulses cumulatively representing the bridge imbalance;

counting the pulses generated;

changing the resistance in the bridge in uniform incremental amounts respectively in time relation with each count until the bridge becomes balanced; and registering the incremental changes in resistance as a function of the weight of the object.

17. A method as defined in claim 16 further comprising matrixing zeros or full scale nines and the count direction and converting the matrix to a display of weight condition when the object has a weight in excess of a maximum level and when the object has a weight less than a minimum level.